(12) United States Patent
Antonelli et al.

(10) Patent No.: US 7,251,196 B1
(45) Date of Patent: Jul. 31, 2007

(54) PASSIVE OPTICAL DETECTION OF UNDERWATER SOUND

(75) Inventors: Lynn T. Antonelli, Cranston, RI (US); Fletcher A. Blackmon, Forestdale, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 185 days.

(21) Appl. No.: 11/151,191

(22) Filed: May 31, 2005

(51) Int. Cl.
*G01H 9/00* (2006.01)
(52) U.S. Cl. .................................................... 367/149
(58) Field of Classification Search ................ 367/120, 367/149, 1; 356/502
See application file for complete search history.

(56) References Cited

U.S. PATENT DOCUMENTS

| | | | |
|---|---|---|---|
| 3,153,236 A * | 10/1964 | Rines | 367/1 |
| 4,518,254 A * | 5/1985 | Penny et al. | 356/5.08 |
| 5,175,713 A | 12/1992 | Ballard | |
| 5,379,270 A | 1/1995 | Connolly | |
| 5,504,719 A | 4/1996 | Jacobs | |
| 5,608,166 A | 3/1997 | Monchalin et al. | |
| 5,767,941 A | 6/1998 | Ferguson | |
| 5,886,264 A | 3/1999 | Hu et al. | |
| 5,943,115 A * | 8/1999 | Ferguson | 351/209 |
| 5,973,309 A * | 10/1999 | Livingston | 250/203.1 |
| 6,034,760 A | 3/2000 | Rees | |
| 6,400,452 B1 * | 6/2002 | Maynard | 356/141.1 |
| 6,420,694 B1 * | 7/2002 | Greenwood | 250/221 |
| 6,451,008 B1 * | 9/2002 | Frey et al. | 606/10 |

* cited by examiner

*Primary Examiner*—Daniel T Pihulic
(74) *Attorney, Agent, or Firm*—James M. Kasischke; Michael P. Stanley; Jean-Paul A. Nasser

(57) ABSTRACT

A passive acoustic sensor that may be employed to detect sounds emanating from under the surface of a body of water. The sensor uses optics to determine vibration on the surface of a water body to detect sound pressure waves from underwater sound sources. The sensor is deployed above the surface and has no direct interaction with anything under the surface that may be emanating sounds. This allows the invention to operate without interfering with potential sound sources as well as allows for numerous deployment methods.

15 Claims, 4 Drawing Sheets

PASSIVE OPTICAL DETECTION OF UNDERWATER SOUND

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

This invention relates in general to passive sensors, more particularly to passive acoustic sensors, and most particularly to passive acoustic sensors to detect sound emanating from under water.

2. Description of the Prior Art

There are many potential sources of acoustic sounds emanating from under water, such as in the ocean. For example, cetacean mammals, such as dolphins and whales, emit broadband, short duration clicks for echolocation and longer duration, narrow band, frequency modulated whistles for communication. Also, certain man-made objects, placed or released underwater, also project sounds at various frequencies.

The present passive method for identifying these types of sounds is to place hydrophones under the water and set these devices to record. After a certain period of time, these recordings are assembled into database systems. The database systems may be provided to researchers that study cetacean mammal migratory or behavioral patterns as well as users attempting to identify man-made sources projecting acoustic signatures underwater.

However, the use of such in-water devices is problematic because the devices themselves may disrupt the behavior of undersea life. Also, the ships that carry, place, and maintain the in-water devices produce significant noise that can also disrupt undersea life or interfere with acoustic signals emanating from underwater objects that the devices are attempting to identify.

Therefore, it is desired to provide a passive sensor to detect acoustic sounds emanating from under water that does not interfere with or startle the source of the acoustic sounds.

SUMMARY OF THE INVENTION

The invention proposed herein comprises a passive acoustic sensor that may be employed to detect sounds emanating from under the surface of a body of water. The sensor is deployed above the surface and has no direct interaction with anything under the surface that may be emanating sounds. This allows the invention to operate without interfering with potential sound sources as well as allows for numerous deployment methods.

Accordingly, it is an object of this invention to provide a passive acoustic sensor for detecting sounds emanating from under the surface of a body of water.

It is a further object of this invention to provide a passive acoustic sensor that does not interfere with or startle sound sources under the surface of a body of water.

This invention meets these and other objectives related to passive sensors for detecting sound emanating from underwater by providing a passive acoustic sensor that is deployed above the surface of a body of water. The passive acoustic sensor is placed on a rotational platform. The platform may be attached to a moving or stationary object within the body of water or a moving object in the air above the water. At least one acousto-optic sensor is mounted to the rotational platform. At least one acousto-optic sensor, preferably a laser interferometer, maintains a reference laser beam while providing at least one output laser beam to at least one point on the surface of the water. The acousto-optic sensor also includes receiving optics to receive a reflection of the output laser beam from the surface. The invention also includes a signal processor to measure acoustic vibration of the surface by comparing the phase modulation of the reference laser beam to the phase modulation of the reflection of the output laser beam. This acoustic data shows whether or not sounds are emanating from under the surface of the body of water. The signal processor is also normally included within a laser interferometer. A control system in electrical communication with the acousto-optic sensor and in mechanical communication with the rotational platform is also employed. The control system includes a processor to accept and process the acoustic data, a controller to move the rotational platform when directed by the processor, and a recorder to record the acoustic data.

BRIEF DESCRIPTION OF THE DRAWINGS

The accompanying drawings, which are incorporated in and constitute a part of the specification, illustrate embodiments of the invention, and, together with the description, serve to explain the principles of the invention.

FIG. 1 is

DESCRIPTION OF PREFERRED EMBODIMENTS

The invention, as embodied herein, comprises a passive acoustic sensor used for detecting sounds emanating from under the surface of a body of water. Specifically, the invention is designed to operate in an ocean environment, wherein turbulent waters are prevalent. Rather than employ standard hydrophones placed beneath the water to detect sound, the present invention detects sound pressure waves that occur when sound is emanated from within a body of water. Because the air-water interface at the surface of a body of water is a pressure release surface (due to the difference in acoustic impedance between the air and the water environments), the sound pressure waves created by a sound emanating under the surface cause the surface to vibrate. This vibration can be detected optically using an acousto-optic sensor, such as a laser interferometer. Therefore, detection of sounds emanating from underwater may be accomplished via an optic sensor placed above the surface of the water. The source of such sounds include cetacean mammals or man-made objects that produce acoustic signals over a relatively broad range of frequencies.

However, there are potential problems in using such a system in turbulent waters, such as the ocean. Because the water acts as a specular reflector, the narrow laser beam employed by a sensor, such as a laser interferometer, must be almost perpendicular to the surface of the water in order to obtain a reflected beam to return to the sensor in order to make the optical "detection" as described above (since the transmitting and receiving optics for such sensors are normally co-located). Due to the turbulent nature of water in external environments, potential intermittent loss of the reflected beam is expected, and will increase as the slope of the wave surface changes relative to the laser beam angle. Therefore, a water surface with a poor reflective quality or that is highly turbulent will degrade optical sensor performance by increasing signal dropout rate. Various embodiments of the present invention have been developed to address these issues and are described in detail below.

Figure 1A:
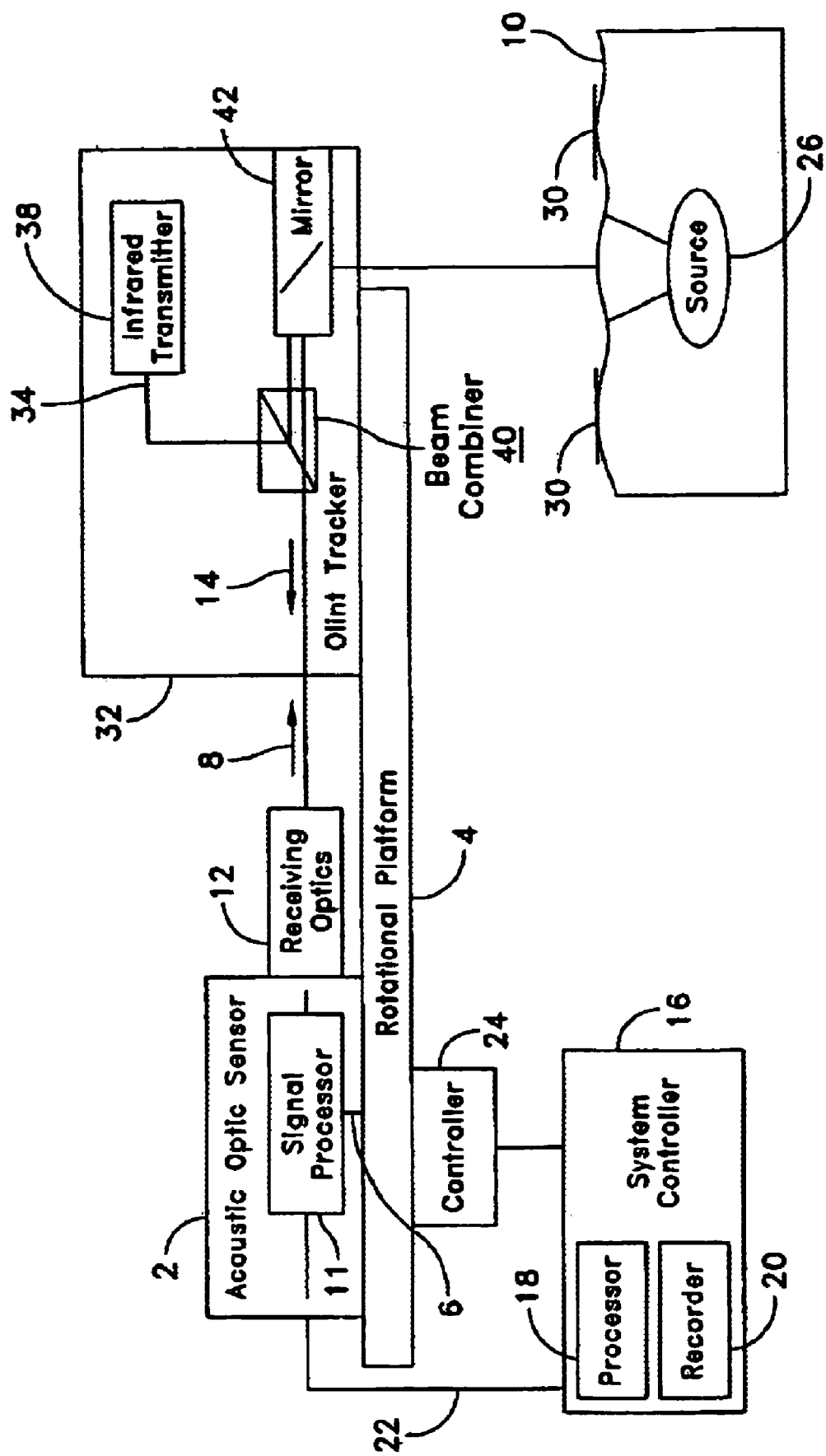
FIGS. 1A and 1B depict an embodiment of the present invention employing a glint tracker and retro-reflectors.
Figure 1B:
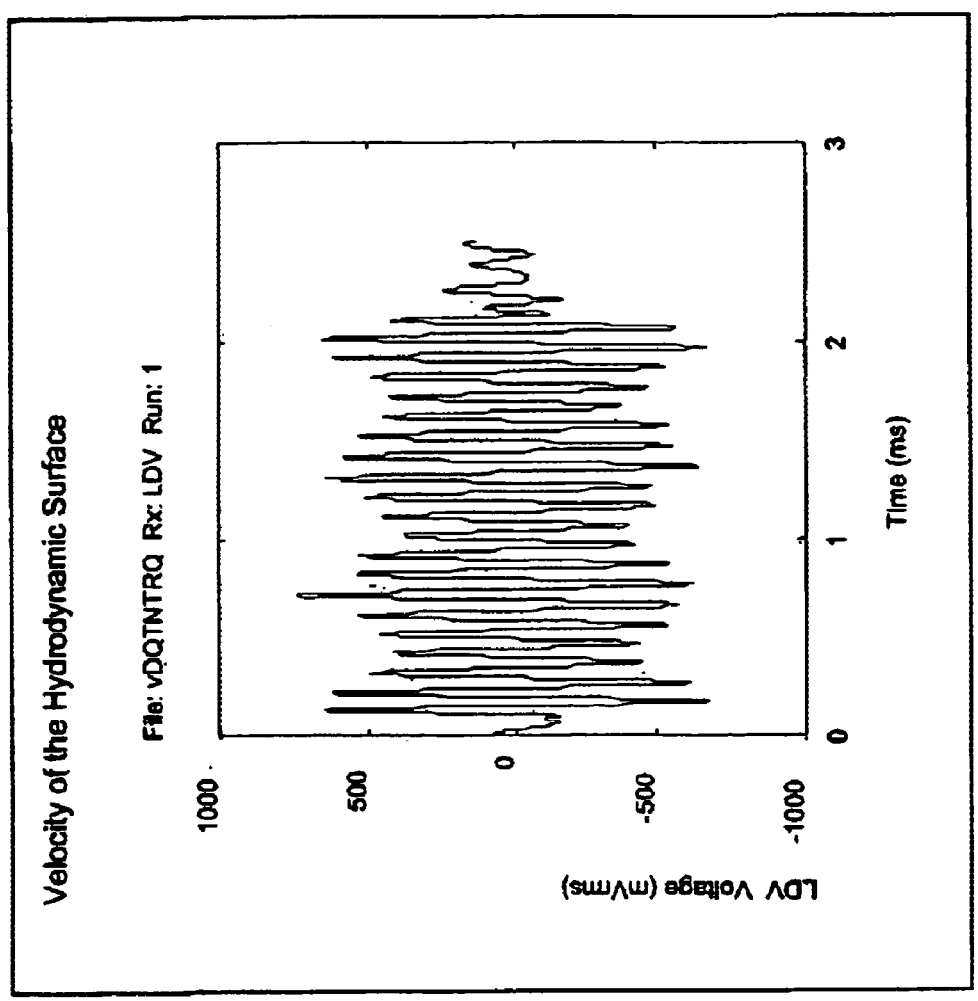

Referring to FIGS. 1A and 1B, the invention comprises at least one acousto-optic sensor 2, preferably a laser interferometer such as a laser Doppler vibrometer (LDV), mounted upon a rotational platform 4. The rotational platform 4 may be supported by various structures or vehicles including a platform extending into a body of water, a ship, or an airborne vehicle. An LDV 2 operates by producing an internal laser beam, which is split, a reference laser beam 6 is maintained within the LDV 2, while an output laser beam 8 is emitted from the LDV 2. The output laser beam 8 is directed toward a reflective surface 10, in this case the surface of a body of water. The output laser beam 8 becomes a reflected output beam 14 at the surface 10 and reflects back into the receiving optics 12, which are internal to the LDV 2. A signal processor 11, also internal to the LDV 2, compares the phase modulation of the reference beam 6 to the reflected output beam 14 to determine if any vibration is occurring at the surface 10.

The invention also includes a system controller 16. The system controller 16 is in electronic communication with the LDV 2, by using a connection such as an electronic cable 22. The system controller 16 incorporates a processor 18 to accept and process the acoustic data from the LDV 2 by accepting the velocity/vibration data signal from the LDV 2 and demodulating the signal to output a voltage (data), the voltage amplitude corresponding to the velocity of the water surface 10. A recorder 20 is also incorporated into the system controller 16 to record processed acoustic velocity/vibration data.

The system controller 16 is also in mechanical communication with the rotational platform 4 via a rotation controller 24. The rotation controller 24 may be any device that can receive a signal from the system controller 16 and move the rotational platform 4. Such devices are well known and may be selected by one skilled in the art. One example of a controller 24 may be a motorized rotation stage or a dual axis tip/tilt device. Additional fine scale adjustment of the laser beam would be accomplished using positioning mirrors as part of a glint tracker device. In a preferred embodiment, the system controller 16 is a computer, most preferable a laptop or portable computer.

The computer 16, using the processed velocity data, via the controller 24 steers the rotational platform 4, and, in turn, the LDV 2 to either obtain more data points or put the LDV 2 in position to obtain a reflected output beam 14. The computer 16 is also used to process the recorded data and rotator 24 and mirror 42 steering positions used during employment. The acquired time series data (as discussed further below) may be averaged and beamformed. The results may be displayed on the computer 16. Such results may include beam steering coordinates, a plot of recorded time series data, the Fourier transform of the recorded time series data, and/or a spectrogram of the data. Once array data is beamformed, the computer 16 can also display the direction from which a source 26 emanated sound in the water relative to the center of the sensor array.

Figure 3:
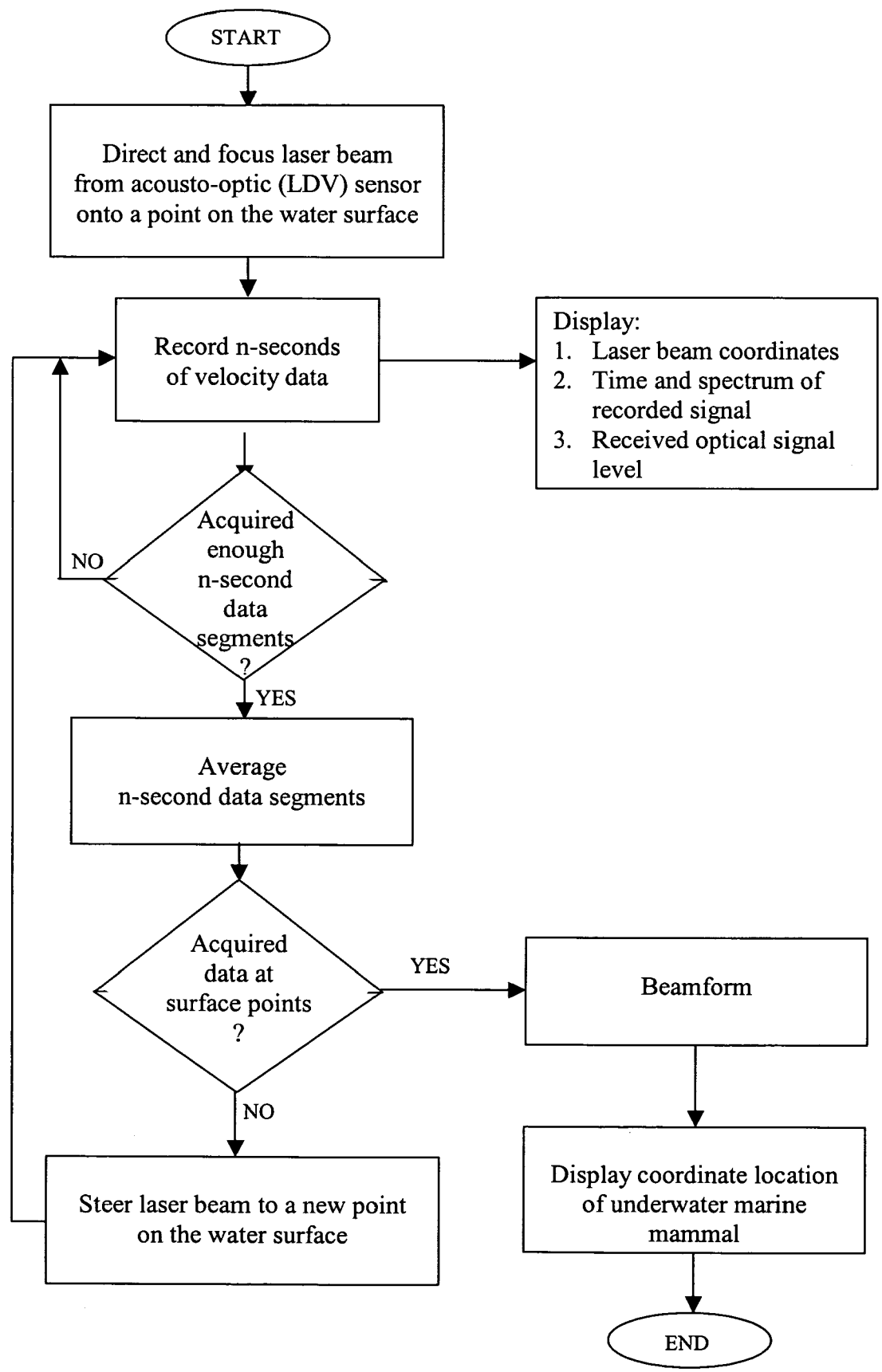
FIG. 3 is a process flow chart that generally describes the operation of an embodiment of the present invention.

Referring to FIG. 3, a process flow diagram of the operation of an embodiment the present invention is depicted. The process includes the following steps:

1. Start

The sensor is mounted on a platform above the water and turned on.

2. Direct and Focus Laser Beam to Point on the Water Surface

The laser beam from the acousto-optic sensor device (LDV) is directed onto a point on the water surface. The laser beam is focused for this distance and sufficient laser reflections shall be obtained at this location. The vibrations of the water surface will modulate the laser beam reflected back towards the LDV. Underwater acoustic signals cause the water surface to vibrate.

3. Record n-Seconds of Velocity Data

The LDV device sends a continuous stream of voltage data to the system controller unit. The system controller unit decodes the voltage from the LDV interferometer unit and sends a voltage signal out representative of the variation in water surface vibration velocity. A specific number of data samples will be acquired at a specified sample rate on a laptop type computer system with data acquisition capabilities (PCMCIA card for example). A typical sample rate may be 50 kHz to 100 kHz. If 2048 samples are desired at a sample rate of 100,000 samples per second, then n=20.48 milliseconds of data are recorded per data segment.

4. Display Laser Beam Coordinates and Time and Spectrogram Results

Information on the direction of the steered laser beam will be displayed along with a plot of the time series data recorded at this location and the spectrogram of this data. The n-second data acquired will be opened by a computer program capable of generating graphs and displaying the desired numerical and graphical results. The numerical and graphical results, along with the optical signal level received by the LDV will be displayed on the computer screen.

5. Acquired Enough n-Second Data Segments ?

It may be desired to acquire more than one n-second data segment from this laser beam location in order to subsequently perform time averaging of the data to reduce noise that is uncorrelated in time. If more n-second data segments are desired (a number may be specified a priori) then they are acquired. Note, if the platform on which the acousto-optic sensor is mounted is moving, then the laser beam may be steered to maintain its location on the water surface while the n-second data segment is being acquired.

6. Averaging

Once enough n-second data segments have been recorded from this laser beam location, the time series data may be averaged together. The time averaging process attempts to present a reduced noise signal by reducing the uncorrelated noise between the acquired time segments. The time-averaged data from several spatially extended locations may be presented to a beamformer. The beamformer algorithm may use the data to localize the sound source.

7. Acquired Data at Enough Surface Points

In order to localize the sound source, data must be obtained in at least two points on the water surface. Additional points increase the angular resolution of the sound source location performance. A number or value of the surface interrogation coordinate points, where the acousto-optic sensor's laser beam is steered, may be pre-programmed. The detection process continues until enough data points at the various laser steering angles have been recorded. The process of obtaining data over a spatial aperture may also be accomplished, and preferred, with an array of passive sensor systems simultaneously recording data.

8. Beamform

Once enough n-second data segments at the desired number of laser beam steering points on the water surface have been acquired, the raw data (or the time averaged data) is applied to a time delay beamformer. Additionally, information on the coordinate location of each of the sensor points on the water surface are presented to the beamformer. The beamformer output indicates the angular coordinate direction towards the sound source relative to the acousto-optic sensor location.

9. Display

The angular coordinate direction of the propagating sound that was detected by the acousto-optic sensor acquired at the various water surface locations and calculated by the beamformer is displayed on the computer screen.

Returning to FIGS. 1A and 1B, in one embodiment of the invention, not depicted, a plurality of acousto-optic sensors 2 may be mounted on the same or additional rotational platform 4. Each sensor 2 may be recorded simultaneously, thereby providing a detector array with reduced (or no) required steering required to obtain multiple data points or to ensure laser beam reflection. A multi-sensor 2 setup improves signal acquisition time between sensor array elements and enhances beamforming performance.

In another embodiment of the invention, laser scanning may be performed at the expense of acquiring fewer data samples for a smaller n-second segment at a given point on the water surface 10. The advantage of using laser scanning is that a larger span on the water surface 10 is interrogated for beamforming analysis in a shorter amount of time. The shorter time may be necessary to capture the sound emanating near simultaneously across the entire array of acousto-optic sensors 2.

As noted above, an LDV 2 requires an almost perpendicular surface 10 to acquire a reflected laser beam 14 to obtain the data necessary for velocity calculations. When a reflective surface 10 because more turbulent, it is difficult to maintain the LDV 2 in a proper position. The descriptions of the following embodiments of the present invention address this issue to increase and enhance performance of the present invention.

In one embodiment of the present invention one or a plurality of retro-reflectors 30 may be deployed on the surface 10. A retro-reflector 30, as used herein, is an object that floats on water and comprises a retro-reflective material adhered to the outer surface of the retro-reflector 30. A retro-reflective material, as used herein, is one that reflects light directly back to its source from most angles. Most retro-reflective materials reflect light directly back to its source at almost any angle. Examples of retro-reflective materials are a polymeric material, a reflective paint material, retro-reflective tape, and retro-reflective materials such as a material containing glass micro-spheres. An example of a retro-reflector 30 is a small float with retro-reflective material adhered to its surface. By placing one or more retro-reflectors 30 on the surface 10 of the water, significantly less steering of the LDV 2 is required to ensure that a reflected laser beam 14 is returned to the LDV 2 receiving optics 12. Turbulence on the surface 10 is obviated due to the inherent reflective properties of the retro-reflector(s) 30. Retro-reflectors 30 may be employed in any embodiments of the invention as described herein to increase the efficiency and enhance the operation of the system.

In another preferred embodiment of the invention, a laser glint tracker 32 may be added to the system. A surface 10 with a poor reflective quality, highly turbulent, high sea state or foamy, will degrade sensor system performance by increasing the signal dropout rate as discussed above. One solution is to monitor the water surface 10 glint, defined as areas of direct reflection back to the laser source, and to actively steer laser positioning mirrors to maintain a lock onto a glint. The result is that the laser output beam 8 is continuously steered onto a position where it will directly reflect a beam 14 back to the receiving optics 12. The tracker 32 would have its own light beam 34 directed onto the water surface 10. Examples of tracker systems that are similar to one used in the present invention can be seen in the following U.S. Pat. Nos. 5,767,941; 5,943,115; 6,451,008; 6,420,694; 6,400,452; and 5,973,309 which are hereby incorporated by reference herein. Several of these patents refer to laser-based tracker systems that are used during eye surgery to accommodate eye motion during the operation. These tracking systems use an algorithm related to their use in order to operate. In order to employ a glint tracker system 32 in the present invention, the algorithm must be modified for use on hydrodynamic surfaces 10. Specific algorithm modifications involve reacquiring a new glint once the glint being tracked either disappears or is lost by the tracker system. The algorithm must also accommodate a wider field of view to search for valid water surface glints and a faster response time relative to the glint lifetime at various sea state conditions. The glint tracker system 32 also accommodates the alignment of the LDV 2 output beam 8 by superimposing the tracker beam 34 on the output beam 8 so that both beams take advantage of the tracker mirror steering as further discussed below.

One embodiment of the glint tracker 32 incorporation in to the present invention follows. The output beam 8 is directed into the glint tracker 32 so that the output beam 8 and the tracker beam 34 (which is generated from an infrared transmitter 38 such as a photodiode) are superimposed using a beam combiner 40. The beams 8 and 34 are directed onto the measurement surface 10 using scanning mirror 42. The beams 8, 34 are steered through a search pattern until a reflection is detected. The tracker 32 uses a reflectometer (not shown) connected to the computer controller 16 with an active feedback loop dependent upon detector response to continually steer the tracker 32 beams 8, 34 onto the measurement surface 10 using scanning mirror 42, to maintain lock on the reflecting portion of the surface 10. The output from the LDV 2 is shown plotted as velocity output versus time.

The laser beam 8 emanating from the LDV 2 is superimposed onto the tracker laser beam 34 in such a way that once the tracker 32 establishes a lock onto a surface 10 glint, the LDV laser beam 8 is also redirected to the glint location on the measurement surface 10. The invention establishes an apparatus that combines a laser glint tracker 32 with the Laser Doppler vibrometer 2 for maintaining uninterrupted LDV 2 measurement while optically probing moving surfaces 10 such as the hydrodynamic (moving water) surfaces. Superimposing these beams together may be done by a combining lens such as a confocal lens. The LDV sensor 2 can then be used to measure the water surface 10 vibrations with reduced signal dropout from the specular reflection of the moving measurement surface 10.

The laser beam 8 emanating from the LDV 2 is superimposed onto the tracker laser beam 34 in such a way that once the tracker establishes a lock onto a surface 10 glint, the LDV laser beam 8 is also redirected to the glint location on the retro-reflective measurement surface 10. This embodiment of the invention establishes an apparatus that combines the laser glint tracker 32 discussed above with the Laser Doppler vibrometer 2 for maintaining uninterrupted LDV 2 measurement while optically probing moving retro-reflective surfaces such as the hydrodynamic (moving water) surfaces 10 possibly seeded with retro-reflectors 30. The LDV sensor 2 can then be used to measure the surface vibrations continuously without signal dropout from the specular reflection of the moving retro-reflective measurement surface 10.

Figure 2:
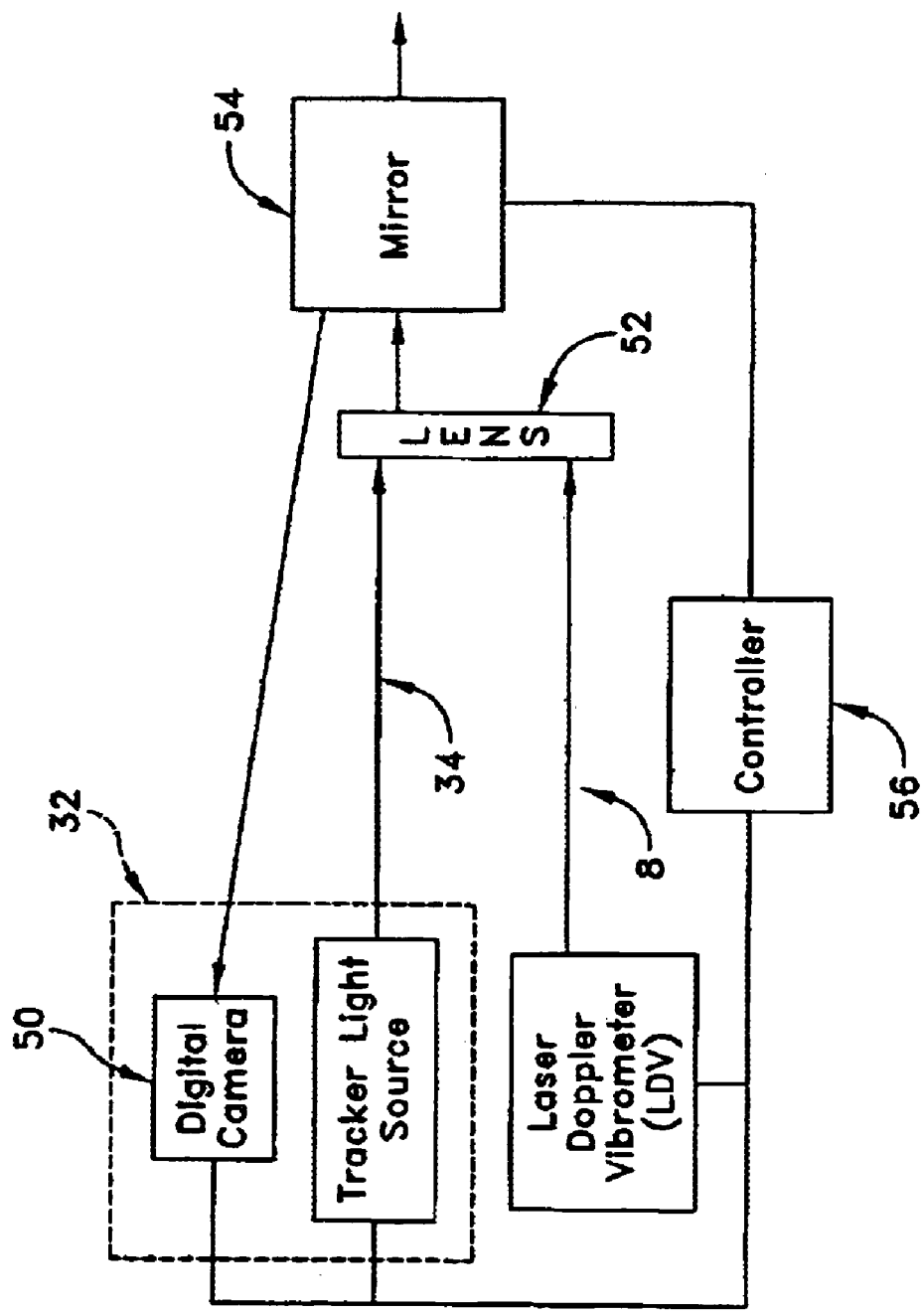
FIG. 2 is a block diagram of a glint tracker of the present invention using a digital camera for a portion of the system optics.

Referring to FIG. 2, in order to further enhance the operation of the system, a digital camera 50 may be added to the laser glint tracker 32. The enhancement is provided by the tracker 32 becoming image-based and actually finding the points where the required reflection will occur as opposed to seeking to find and maintaining the point of reflection by relying on a complicated algorithm. Reacquiring a secondary glint would be simplified using the image based tracker method. The image based tracker method would also support an array of multiple laser vibrometer sensors since it would provide several simultaneous glint solutions. The use of retro-reflectors 30 further enhances the image-based tracker system. Using retro-reflectors as described above allows the interrogation beam 10 from the LDV 2 and the tracker laser beam 34 combination to reflect back along the same optical direction of interrogation. The retro-reflectors 30 also move in a more deterministic fashion on the water surface 10 as compared to a glint feature on the water surface 10 which can vanish with changing wave conditions. The retro-reflectors also have a deterministic shape that is more easily trackable temporally and spatially by the image-based laser-glint tracking device 32. Also, the retro-reflectors provide larger standoff distance as compared to using glints from the water surface 10 which are typically contained mainly between a +/−20 degree cone surrounding an acousto-optic interrogation that is normal to the water surface 10.

The image-based tracker 32 may operate employing the following elements. A 5W CW laser and a Vision Research Phantom digital camera, for example, with greater than or equal to 512×512 resolution and a minimum frame rate of 1000 frames per second to provide a 1 ms time glint evolution tracking with precision glint angle position information. The CW laser source 34 is used for illumination to produce and identify the location of glints on the surface 10. The high-speed digital camera 50 operating at high resolution and high frame rate is used to image a desired size field of view on the water surface 10 from the air. The position of the glints in time and space are recorded by the camera 50 and are used to direct the LDV beam 10 onto one or more glints or retro-reflectors 30. The position of the LDV 2 and its location on the water surface 10 can be determined precisely via steering angle position, GPS and standoff distance calibration to provide known sensing coordinates. The placement of the beam 8 is updated for each image frame and may rely on interframe tracking, if required, using the non-image based tracking system discussed above.

FIG. 2 shows a block diagram of the elements and layout of an image-based tracker 32. The digital camera 50 replaces many of the optics disclosed in the glint tracking systems in the above referenced patents and briefly described above. A tracker light source or laser beam 34 and a laser beam 8 exiting from and LDV 2 are combined/superimposed using an adaptive/confocal lens 52. Beams 8, 34 are directed to at least one or a plurality of steering mirrors 54 that direct the beams 8, 34 toward the water surface (not shown). The digital camera 50 obtains continuous digital images of the surface, either directly or by being directed at the mirrors 54, along a similar angle to that of beam 34. A computer controller 56, normally either a portable computer or personal computer, is in direct communication with all of the elements described above in order to provide feedback and control for the system.

In operation, the computer controller 56 turns on the LDV 2, the tracker light source 34, and the digital camera 50. The digital camera provides an image of the surface to the computer controller 56. Areas of glint are identified and the computer controller 56 steers the mirrors 54 so that the superimposed beams 8, 34 are directed to an area of glint on the surface. The camera 50, at time intervals selected by the user, continues to take digital images of the surface so that the computer controller 56 can modify the position of the beams 8, 34 through the steering mirrors 54 to maintain a "lock" on areas of glint from the surface.

The image-based laser-glint tracker 32 can substantially improve the acousto-optic sensing performance of the system as compared to the performance obtained using only the non image-based laser glint tracker algorithm and hardware in conjunction under surface glint conditions or with retro-reflectors 30. With the image-based tracker 32, the system is capable of measuring vibrations of specularly reflecting surfaces with high speed variations of the temporal and spatial laser-glint pattern and/or deterministic retroreflective surfaces in motion at a slower rate than the corresponding water surface itself.

What is described are specific examples of many possible variations on the same invention and are not intended in a limiting sense. The claimed invention can be practiced using other variations not specifically described above.

What is claimed is:

1. A passive acoustic sensor for detecting sounds emanating from under the surface of a body of water, comprising:
   a rotational platform placed above the surface;
   at least one acousto-optic sensor mounted to the rotational platform, maintaining a reference laser beam, providing at least one output laser beam to at least one point on the surface, having receiving optics to receive a reflection of the at least one output laser beam from the surface;
   a signal processor to measure acoustic vibration of the surface by comparing a phase modulation of the reference laser beam to phase modulations of the reflection of the output laser beam to produce acoustic data; and
   a control system in electrical communication with the at least one acousto-optic sensor and in mechanical communication with the rotational platform, comprising:
   a processor to accept and process the acoustic data from the at least one acousto-optic sensor;
   a controller to move the rotational platform when directed by the processor; and
   a recorder to record the acoustic data.

2. The passive acoustic sensor of claim 1, wherein the acousto-optic sensor comprises a laser interferometer.

3. The passive acoustic sensor of claim 2, wherein the processor comprises a computer.

4. The passive acoustic sensor of claim 1 further comprising at least one retro-reflector placed on the surface.

5. The passive acoustic sensor of claim 4 further comprising a plurality of retro-reflectors placed upon the surface.

6. The passive acoustic sensor of claim 2 further comprising a laser glint tracker in communication with the at least one acousto-optic sensor to direct the output laser beam to receive a reflection of the output laser beam from the surface.

7. The passive acoustic sensor of claim 6, wherein the output laser beam is input into the laser glint tracker so as to superimpose the output laser beam onto a tracker laser beam emanating from the laser glint tracker.

8. The passive acoustic sensor of claim 7, wherein the laser glint tracker comprises a plurality of moveable mirrored surfaces to direct the tracker laser beam.

9. The passive acoustic sensor of claim 8, wherein the laser glint tracker comprises a tracker controller, having active feedback, that adjusts a position of the output laser beam to maintain a reflection from the surface.

10. The passive acoustic sensor of claim 1 further comprising an image glint tracker, comprising:
 a digital camera, wherein the digital camera takes a digital image of the surface; and
 a processor to identify one or more glint points from the digital image in communication with the control system so the at least one acousto-optic sensor is positioned so the output laser beam strikes the one or more glint points.

11. The passive acoustic sensor of claim 9 wherein the laser glint tracker further comprises:
 a digital camera, wherein the digital camera takes a digital image of the surface; and
 a processor to identify one or more glint points from the digital image in communication with the control system so the laser interferometer is positioned so the output laser beam strikes the one or more glint points.

12. A method of detecting acoustic sounds emanating from under the surface of a body of water, comprising the steps of:
 providing at least one acousto-optic sensor mounted to a rotational platform, maintaining a reference laser beam, providing at least one output laser beam to at least one point on the surface, having receiving optics to receive a reflection of the at least one output laser bean from the surface;
 providing a signal processor to measure acoustic vibration of the surface by comparing a phase modulation of the reference laser beam to phase modulations of the reflection of the output laser beam to produce acoustic data;
 providing a control system in electrical communication with the at least one acousto-optic sensor and in mechanical communication with the rotational platform to accept and process the acoustic data from the at least one acousto-optic sensor, move the rotational platform, and record the acoustic data; and
 moving the rotational platform to maintain the reflection.

13. The method of claim 12 further comprising the step of placing a plurality of retro-reflectors on the surface.

14. The method of claim 13 further comprising the step of providing a laser glint tracker in communication with the at least one acousto-optic sensor to direct the output laser beam to receive a reflection of the output laser beam from the surface.

15. The method of claim 14 wherein the laser glint tracker comprises a digital camera, wherein the digital camera takes a digital image of the surface and a processor to identify one or more glint points from the digital image in communication with the control system so the at least one acousto-optic sensor is positioned so the output laser beam strikes the one or more glint points.

* * * * *